US012752986B2

(12) United States Patent
Scotton et al.

(10) Patent No.: US 12,752,986 B2
(45) Date of Patent: Oct. 6, 2026

(54) SELF-VENTING CLOSURE

(71) Applicant: Silgan Dispensing Systems Slatersville, LLC, Slatersville, RI (US)

(72) Inventors: James E. Scotton, Foxborogh, MA (US); Patrick J. Brannon, Warwick, RI (US)

(73) Assignee: Silgan Dispensing Systems Slatersville, LLC, Slatersville, RI (US)

( * ) Notice: Subject to any disclaimer, the term of this patent is extended or adjusted under 35 U.S.C. 154(b) by 214 days.

(21) Appl. No.: 17/929,529

(22) Filed: Sep. 2, 2022

(65) Prior Publication Data

US 2022/0411144 A1 Dec. 29, 2022

Related U.S. Application Data

(63) Continuation of application No. 16/917,863, filed on Jun. 30, 2020, now Pat. No. 11,440,710.

(51) Int. Cl.

| | |
|---|---|
| ***B65D 51/16*** | (2006.01) |
| ***B67D 3/00*** | (2006.01) |
| *B65D 1/20* | (2006.01) |
| *B65D 25/40* | (2006.01) |
| *B65D 25/42* | (2006.01) |

(52) U.S. Cl.

CPC ..... *B65D 51/1644* (2013.01); *B65D 51/1683* (2013.01); *B65D 51/1688* (2013.01); *B67D 3/00* (2013.01); *B65D 1/20* (2013.01); *B65D 25/40* (2013.01); *B65D 25/42* (2013.01)

(58) Field of Classification Search

CPC .......... B65D 1/20; B65D 1/0276; B65D 1/06; B65D 25/2894; B65D 25/42; B65D 2205/00; B65D 51/1644; B65D 51/1683; B65D 51/1688; B67D 3/00

USPC .......................................... 222/212, 481, 482

See application file for complete search history.

(56) References Cited

U.S. PATENT DOCUMENTS 2,224,296 A 12/1940 Hoffman
2,894,524 A 7/1959 Gill
3,159,320 A * 12/1964 Scholtz .............. B65D 25/2826 220/768
3,386,632 A * 6/1968 Sager ..................... B65D 47/20 251/351

(Continued)

FOREIGN PATENT DOCUMENTS

AU 2013204434 B2 12/2016
GB 2249084 A 2/1995
WO 2016089912 A1 6/2016

*Primary Examiner* — Charles P. Cheyney

(74) *Attorney, Agent, or Firm* — Hinckley, Allen & Snyder; Stephen J. Holmes

(57) ABSTRACT

A self-venting closure assembly includes a closure body having a deck with a peripheral mounting skirt and an annular seal on an underside of the deck adjacent to the peripheral mounting skirt. The closure body further includes a circular valve seat within the center portion of the deck, and a plurality of vent openings circumferentially spaced within the valve seat. An elastomeric umbrella valve is centrally mounted to the deck and has a frustoconical valve flap arranged on an underside of the valve seat. The valve flap cooperates with the vent openings to normally seal the vent openings but permits air to flow into an interior of the closure body when a vacuum is applied to an interior of the container on which the closure is mounted.

17 Claims, 8 Drawing Sheets

(56) References Cited

U.S. PATENT DOCUMENTS 3,403,696 A * 10/1968 Pynchon ............... F16K 15/148 137/516.13
D213,949 S * 4/1969 Lenhart .......................... D9/535
3,454,182 A 7/1969 Morton
3,511,407 A * 5/1970 Palma ....................... A61J 9/04 215/11.1
3,595,429 A 7/1971 Kohen
4,019,629 A 4/1977 Dubner et al.
4,135,513 A 1/1979 Arisland
4,210,255 A 7/1980 Pan
4,360,326 A 11/1982 Buchholz et al.
4,401,224 A * 8/1983 Alonso ..................... A61J 9/04 137/511
4,420,101 A 12/1983 O'Neill
4,428,478 A 1/1984 Hoffman
4,506,809 A 3/1985 Corsette
4,640,426 A 2/1987 Wasley
4,658,979 A * 4/1987 Mietz ..................... B65D 83/42 141/3
4,750,314 A 6/1988 Mietz et al.
4,763,802 A 8/1988 Johnston
4,811,870 A * 3/1989 Bianco ................... B65D 25/50 222/536
4,828,126 A * 5/1989 Vincinguerra ............ A61J 9/04 215/11.1
4,842,165 A * 6/1989 Van Coney .......... B65D 83/771 222/105
4,890,760 A * 1/1990 Nicoll, Sr. ................ B65F 1/06 220/908
4,921,071 A * 5/1990 Lonnborg .............. F01M 11/06 184/45.1
4,923,098 A * 5/1990 Schoonover ....... B65D 25/2894 220/675
4,958,633 A * 9/1990 Angell ..................... A62B 9/02 D24/110.2
5,027,784 A 7/1991 Osawa et al.
D326,050 S * 5/1992 Stockstill .................. D23/211.2
5,129,426 A 7/1992 Boehmer
5,231,982 A * 8/1993 Harrison ................ A62B 18/10 128/206.28
5,307,836 A * 5/1994 Niceley ................... B60T 17/06 303/85
5,397,024 A 3/1995 Wu et al.
5,433,353 A * 7/1995 Flinn .................. B65D 51/1672 222/206
5,449,079 A 9/1995 Yang
5,507,318 A * 4/1996 Israelson ............. F16K 15/1402 137/854
5,619,972 A 4/1997 Kuenzli et al.
5,649,859 A 7/1997 Shiga
5,699,920 A * 12/1997 Ida ............................ A61J 9/04 215/11.5
5,848,690 A 12/1998 Granger et al.
5,908,129 A 6/1999 Schutz
5,944,211 A 8/1999 Woodnorth et al.
5,974,819 A * 11/1999 Poling .................... H01H 9/047 62/263
5,988,414 A 11/1999 Schwarz et al.
6,021,912 A 2/2000 Hertrampf
6,035,769 A 3/2000 Nomura et al.
6,042,850 A * 3/2000 Ida ....................... A61J 11/0085 215/11.4
6,341,721 B1 1/2002 Herald et al.
6,364,163 B1 * 4/2002 Mueller ............. B65D 83/0072 222/481.5
6,435,382 B1 * 8/2002 Giblin .................. B65D 47/248 222/509
6,516,829 B1 2/2003 Townsend et al.
6,557,462 B1 5/2003 Wang
6,644,510 B2 * 11/2003 Kawolics ........... B65D 47/2075 222/105
6,863,261 B2 * 3/2005 Swan .................. B29C 45/4407 251/356
6,874,656 B2 4/2005 Rohr et al.
6,883,675 B2 4/2005 Maenke
6,951,295 B1 * 10/2005 Gaus ................. B05B 11/00442 222/484
7,048,136 B2 * 5/2006 Havens .............. B65D 51/1644 222/509
7,051,891 B2 * 5/2006 Darr ....................... B65D 23/10 40/310
7,082,967 B2 8/2006 Sarajian et al.
7,201,287 B2 4/2007 Maenke
7,249,694 B2 7/2007 Masuda
7,500,585 B2 3/2009 Masuda
7,621,416 B2 * 11/2009 Bursztein ........... B65D 81/2038 220/367.1
7,900,788 B2 3/2011 Gaillot et al.
D643,288 S 8/2011 Taylor
8,146,765 B2 4/2012 Chen
8,317,064 B2 * 11/2012 Pang ...................... B65D 37/00 222/481
8,376,164 B2 2/2013 Perrin et al.
8,434,633 B2 5/2013 Beer et al.
D687,709 S 8/2013 Taylor
8,544,702 B2 * 10/2013 Joyce ..................... B65D 25/48 222/481.5
8,561,851 B1 * 10/2013 Leonoff ................ F16K 15/147 137/853
8,701,929 B1 * 4/2014 Long ........................ B65D 1/20 215/276
9,618,131 B2 * 4/2017 Lee ........................ B65D 77/00
9,701,452 B2 7/2017 Lackey et al.
9,713,402 B2 * 7/2017 Park ....................... B65D 45/20
9,714,126 B2 7/2017 Rye et al.
10,273,061 B1 4/2019 Lin
2003/0038131 A1 2/2003 Noruma et al.
2005/0045666 A1 3/2005 Kasting
2006/0138180 A1 * 6/2006 Giblin .................... B65D 41/26 222/570
2007/0205194 A1 9/2007 Tung
2008/0105674 A1 5/2008 Hsu
2008/0110911 A1 5/2008 Chen
2008/0135793 A1 * 6/2008 Forbis .................... B65D 43/18 251/309
2008/0178884 A1 7/2008 Gerson et al.
2010/0084396 A1 4/2010 Wu
2010/0263328 A1 10/2010 Dorsey et al.
2012/0138171 A1 * 6/2012 Coolens ................ F16K 15/148 137/511
2012/0248110 A1 10/2012 Wu
2012/0267369 A1 10/2012 Duvigneau
2012/0318243 A1 * 12/2012 Williams ........... F02M 25/0836 137/15.18
2018/0273256 A1 * 9/2018 Smith .................... B65D 47/32
2018/0273281 A1 * 9/2018 Latimer ............... B65D 77/225
2019/0112106 A1 * 4/2019 Malin .................... B65D 51/16

* cited by examiner

SELF-VENTING CLOSURE

CROSS-REFERENCE TO RELATED APPLICATIONS

This application is a continuation of U.S. application Ser. No. 16/917,863, filed Jun. 30, 2020.

BACKGROUND OF THE DISCLOSURE

(1) Field of the Invention

The instant invention generally relates to a liquid dispensing system with an unvented dispensing tap that requires a separate vent opening to prevent paneling of the container when product is dispensed from the tap.

(2) Description of Related Art

Existing dispensing systems with unvented dispensers require a separate vent opening to allow proper operating of the dispensing tap and to prevent paneling of the container caused by a vacuum within the container as product is dispensed. An example of this type of system is a large format laundry detergent container. The existing systems typically include a vent opening with a threaded neck and a closure which is screwed tightly closed for storage and handling, but which must be partially unscrewed to allow air into the vent opening during use. This required action is a particular point of complaint for the consumer. Many users fail to unscrew the closure, or fail to unscrew it a sufficient amount, to allow appropriate venting for proper performance of the dispensing tap.

SUMMARY OF THE DISCLOSURE

The present disclosure describes a self-venting closure assembly which does not require any action by the consumer for proper functionality.

An exemplary embodiment comprises a self-venting closure assembly comprising a closure body having a deck with a peripheral mounting skirt and an annular seal on an underside of the deck adjacent to the peripheral mounting skirt. The closure is configured for and intended to be used with a container for a liquid product which has an unvented dispensing tap.

In some embodiments the mounting skirt may be threaded or provided with bayonet type connection so that it can be removably mounted onto a neck of a vent opening in the container. In other embodiments, the mounting skirt may be permanently secured about the vent opening of the container. The annular seal may in some embodiments comprise an annular gasket received between the deck and the lip of the vent opening in the container. In other embodiments the annular seal may comprise a sealing rib which extends downwardly from the underside of the deck and engages the container neck.

With respect to the venting function, the closure body includes a circular valve seat within the center portion of the deck, and a plurality of vent openings concentrically spaced around the center of the valve seat.

An elastomeric umbrella valve includes a mounting stem centrally mounted through a mounting hole in the deck and has a frustoconical valve flap arranged on an underside of the valve seat. The valve flap extends radially outward from the mounting stem and cooperates with the vent openings to normally seal the vent openings, but permits air to flow into an interior of the closure body when a vacuum is applied to an interior of the container on which the closure is mounted.

It can thus be appreciated that the exemplary embodiment provides a unique self-venting closure which eliminates the need for the consumer to manually open a vent cap while also reducing any potential leak points between the liquid product in the container and the environment.

BRIEF DESCRIPTION OF THE DRAWING FIGURES

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE EXEMPLARY EMBODIMENTS

Figure 1:
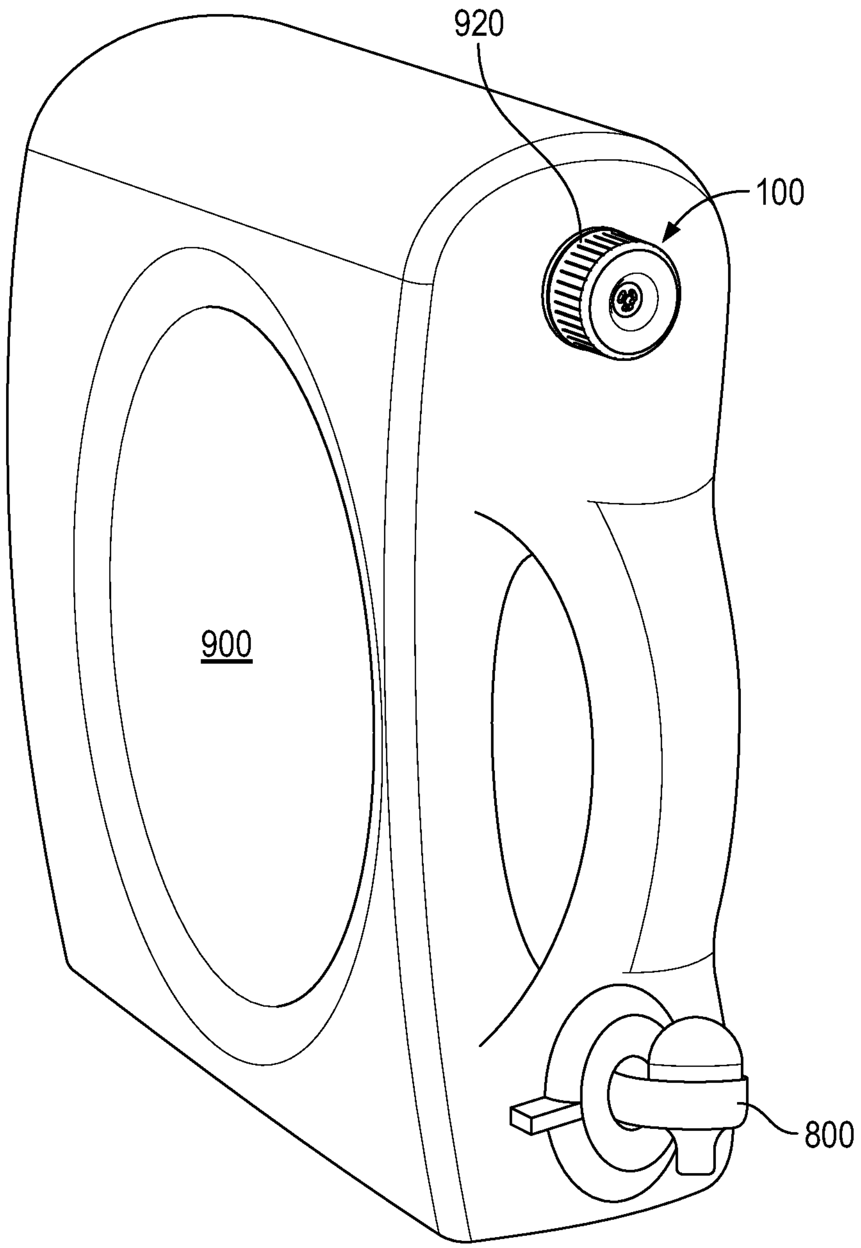
FIG. 1 is a perspective view of an exemplary embodiment of a self-venting closure mounted on a container with a dispensing tap in accordance with the present invention.
Figure 2:
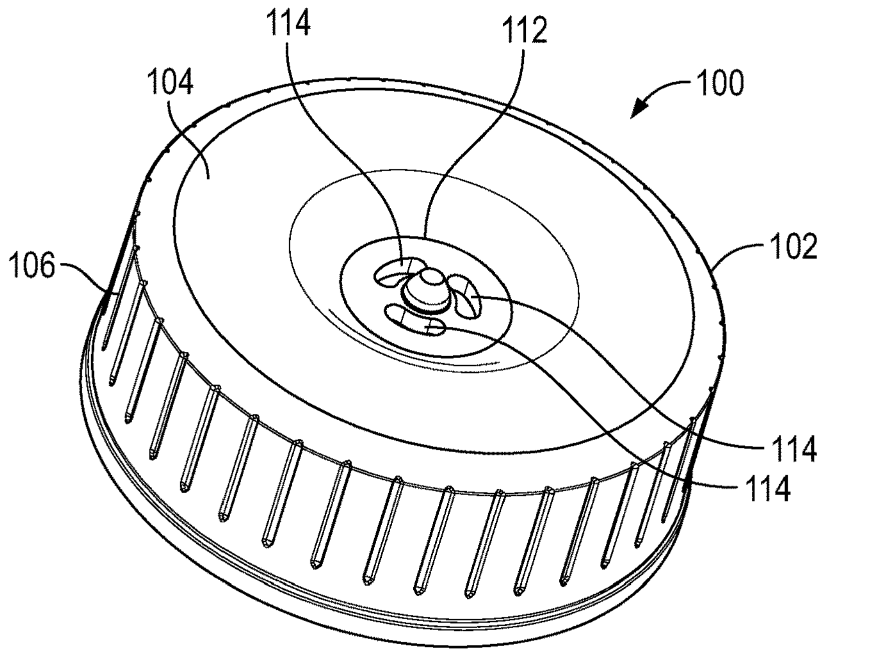
FIG. 2 is a perspective view of the self-venting closure.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Referring now to the drawings, an exemplary embodiment of a self-venting closure 100 is illustrated in FIGS. 1-8. While reference is made to dispensing systems for liquid products, it should be understood that the presently described types of self-venting closures can also be used with other dispensing systems.

Referring to FIG. 1, an exemplary dispensing container 900 and self-venting closure 100 is illustrated. The container 900 is generally configured for holding a volume of liquid product (not shown) which can be dispensed through a tap-like dispenser 800. The container 900 may be formed from a blow-molded plastic material or may be formed by and from other means and materials. The dispensing tap 800 may be unvented and thus the container 900 may require a separate vent opening 910 to allow proper operating of the dispensing tap 800 and to prevent paneling of the sidewalls of the container 900 caused by a vacuum within the container 900 as product (not shown) is dispensed from the tap 200. An example of this type of system is a large format laundry detergent container, but other liquid dispensing systems and dispensing taps are also contemplated.

Figure 4:
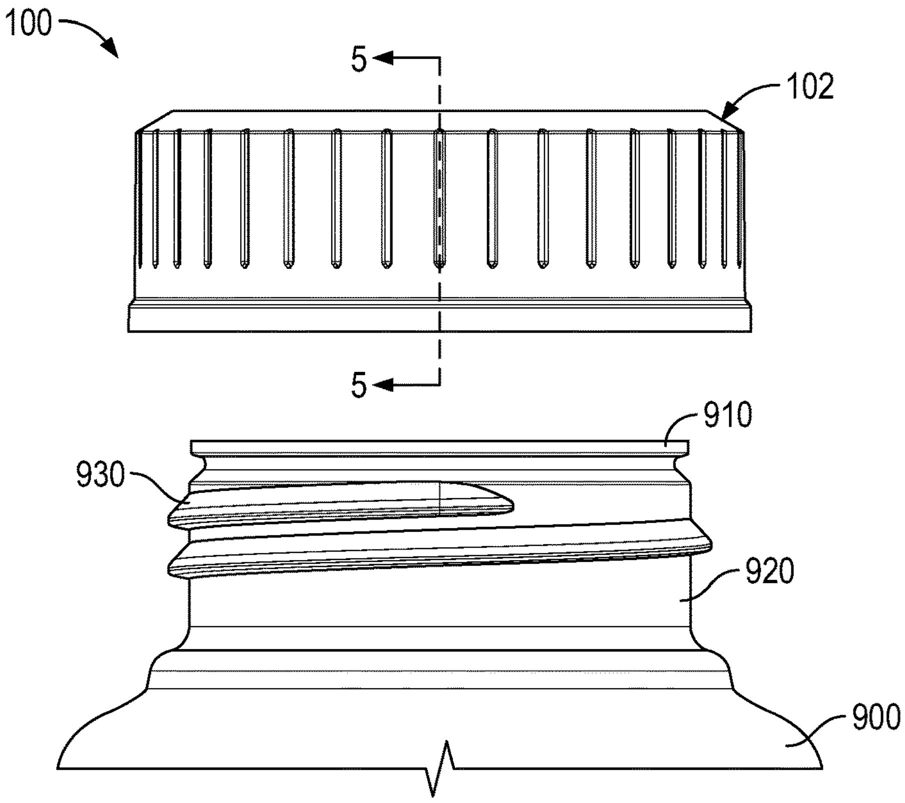
FIG. 4 is a plan view thereof shown with an exemplary venting neck.

Referring briefly to FIGS. 1 and 4, the vent opening 910 comprises a neck 920 which projects from the container 900 at a location which will be positioned above the liquid level when the container is in use.

An exemplary self-venting closure assembly 100 comprises a closure body 102 having a deck 104 with a peripheral mounting skirt 106 extending therefrom and an annular seal 108 on an underside of the deck 104 adjacent to the peripheral mounting skirt 106. The seal 108 is intended to cooperate with the container neck 920 to form a seal between the underside of the deck 104 and the container neck 920. The closure body 102 may be molded or otherwise formed from a high density polyethylene (HDPE) plastic, or other suitable plastic material.

Figure 3:
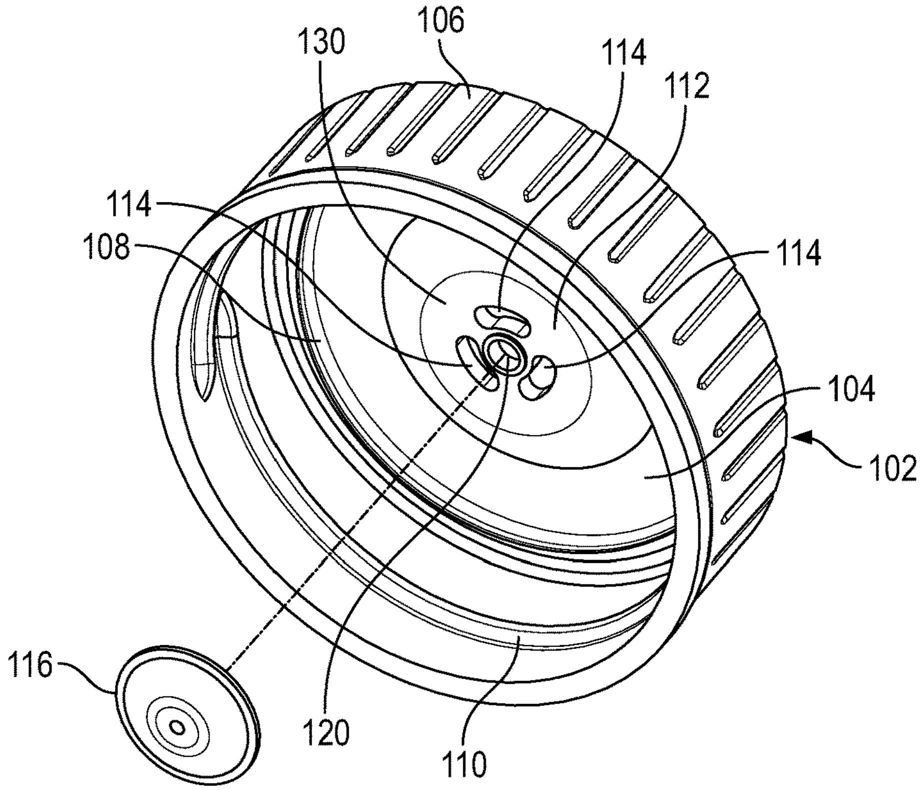
FIG. 3 is an exploded perspective view thereof.
Figure 5:
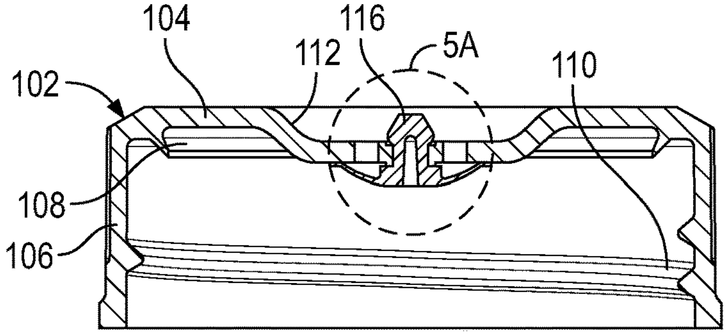
FIG. 5 is a cross-sectional view thereof taken along line 5-5 of FIG. 4.

In some embodiments the mounting skirt 106 and container neck 920 may include complementary mounting formations for releasable or permanent attachment of the closure body 100 to the container 900. For example, the mounting formations may comprise mating threads 110/930 or bayonet surfaces. In some embodiments the mounting skirt 106 may be inwardly threaded as illustrated in FIGS. 3 and 5 so that it can be removably mounted onto a similarly threaded or configured neck 920 of the vent opening 910 in the container 900. In other embodiments, the mounting skirt 106 may be permanently secured about the vent opening 910 of the container 900 by ultrasonic welding or other securing means.

The annular seal 108 may in some embodiments comprise an annular sealing rib which extends downwardly from the underside of the deck 104 to engage and cooperate with the container neck 920. Referring to FIG. 5, in the present embodiment the sealing rib 108 is v-shaped and angled slightly inward so that it extends over the upper lip of the vent neck 920 and rolls inwardly forming a tight seal.

The self-venting function is provided by a circular valve seat 112 within the center portion of the deck 104, a plurality of vent openings 114 concentrically spaced around the center of the valve seat 112 and an umbrella valve 116.

The valve seat 112 may be flush with the rest of the deck 104 or may be slightly recessed inwardly. At least one vent opening 114 must be provided. However, a plurality of circumferentially spaced vent openings 114 has been found to be particularly effective.

Figure 7:
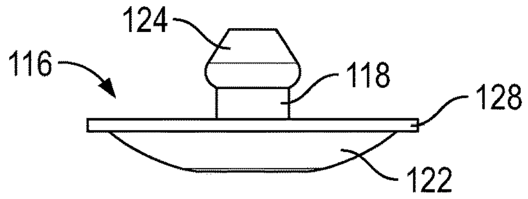
FIG. 7 is plan view of the umbrella valve.
Figure 8:
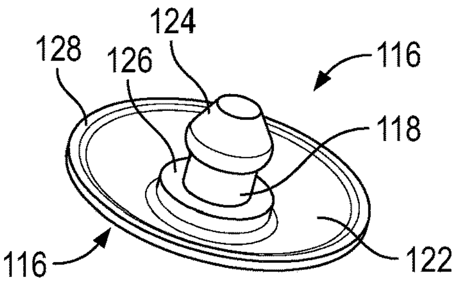
FIG. 8 is a perspective view of the umbrella valve.
Figure 9:
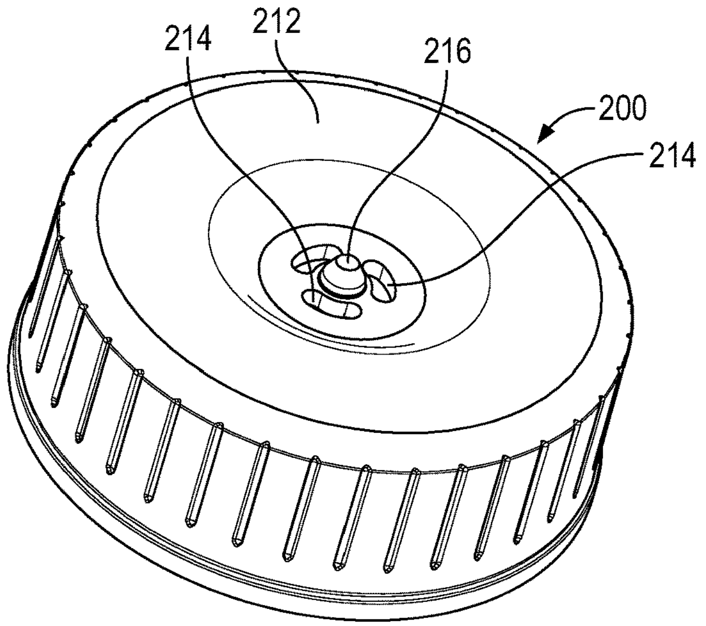
FIG. 9 is a perspective view of another exemplary embodiment of a self-venting closure

Referring to FIGS. 7 and 8, the elastomeric umbrella valve 116 includes a mounting stem 118 mounted through a mounting hole 120 in the center deck 104 and further has a frustoconical valve flap 122 arranged to extend from the mounting stem 118 to an underside of the valve seat 112. The umbrella valve 116 may be formed from silicone or other similar elastomeric materials. To retain the umbrella valve 116 in the mounting hole 120, the mounting stem includes spaced retaining shoulders 124, 126, one being received above the valve seat 112 and the other below the valve seat 112.

The valve flap 122 extends radially outward from the mounting stem 118 terminating in a peripheral annular sealing rim 128 with a flat sealing surface that engages with a circular land area 130 encircling the vent openings 114. The valve flap 122 cooperates with the vent openings 114 and land area 130 to normally seal the vent openings 114 from the interior of the closure body 102, but elastically deforms to permit air to flow into an interior of the closure body 102 when a vacuum is applied to an interior of the container 900 on which the closure 100 is mounted.

Figure 5A:
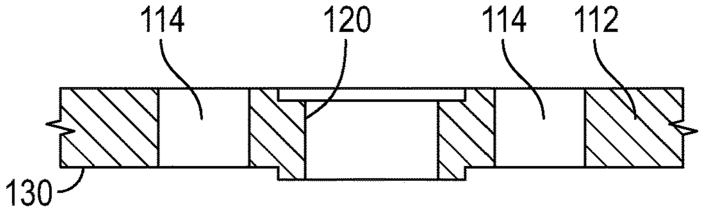
FIG. 5A is an enlarged view of the mounting hole from FIG. 5 with the umbrella valve removed for clarity.
Figure 6:
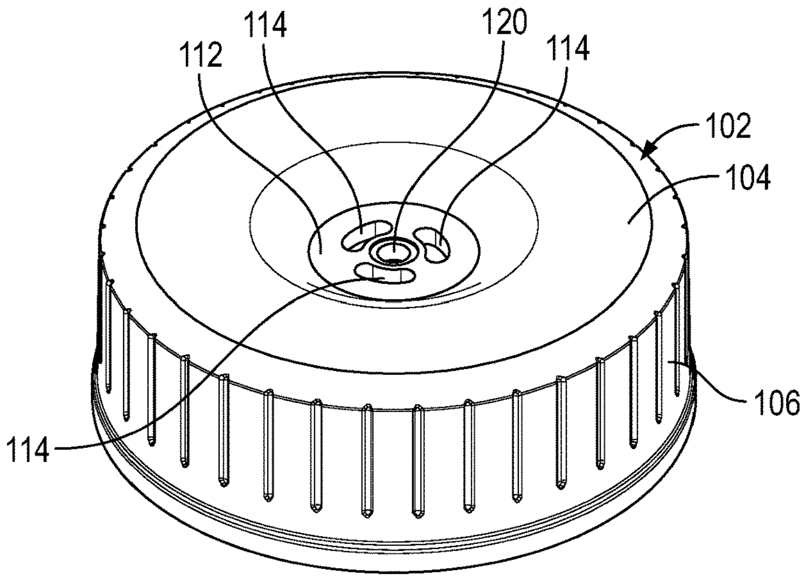
FIG. 6 is a perspective view of the closure body.

It can be seen in enlarged FIG. 5A that the upper and lower surfaces immediately surrounding the mounting hole 120 may be offset inwardly from the remainder of the valve seat 112. This offset may allow the maker to reduce the preloaded tension normally molded into the umbrella valve structure 116. Lowering the position of the valve flap 122 and sealing rim 128 relative to the land surface 130 decreases the normal sealing force and allows adjustment of the amount of vacuum required to open the valve 116.

Referring now to FIGS. 9-14 another exemplary embodiment of a self-venting closure assembly is illustrated and generally indicated at 200. The closure assembly 200 is generally the same as the previously described embodiment 100 and includes the same closure body 202, valve seat 212, vent openings 214, and umbrella valve 216, with only the following differences.

Figure 10:
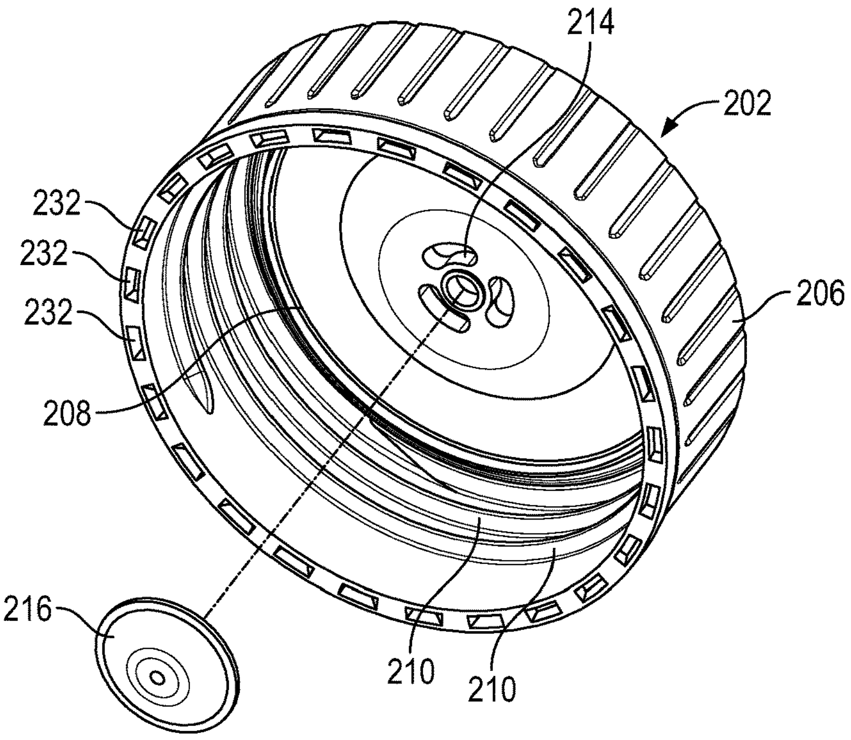
FIG. 10 is an exploded perspective view thereof.
Figure 11:
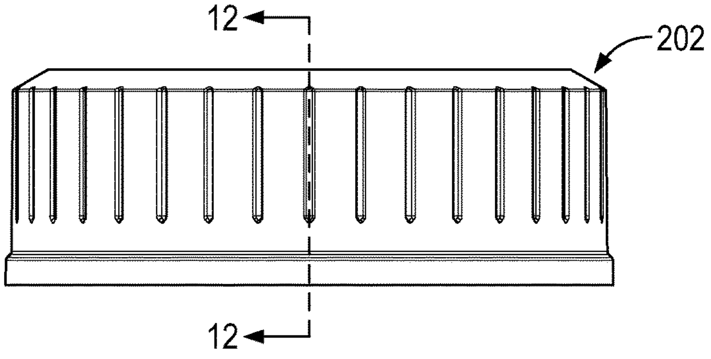
FIG. 11 is a plan view thereof.
Figure 14:
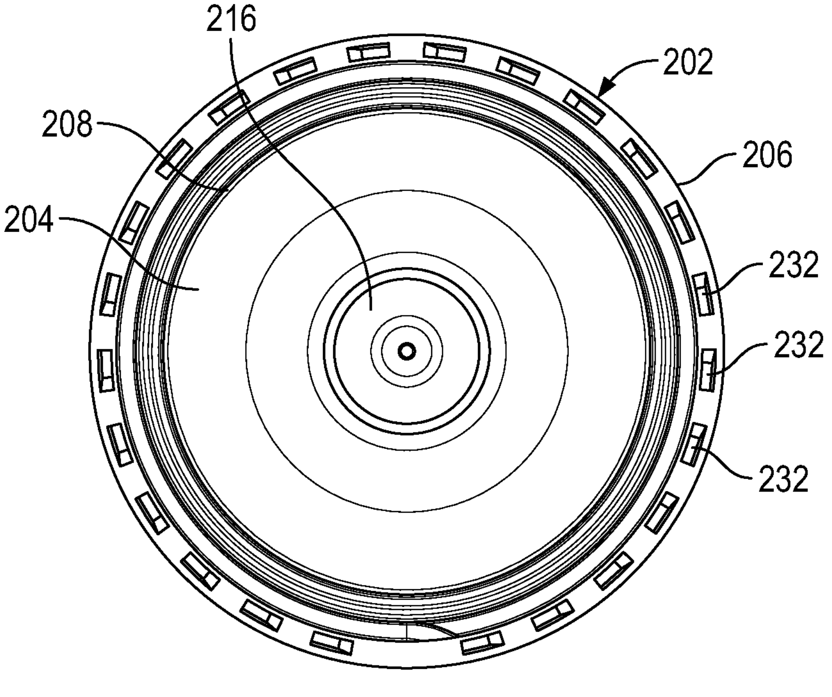
FIG. 14 is bottom view of the closure body.
Figure 15:
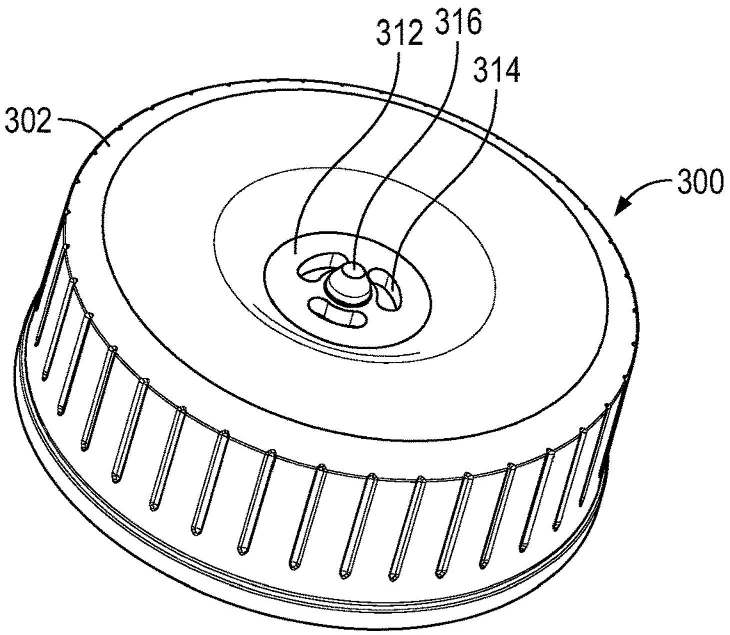
FIG. 15 is a perspective view of yet another exemplary embodiment of a self-venting closure.

Referring to FIGS. 10 and 14, the lower edge of the mounting skirt 206 is provided with a plurality of unscrewing "dogs" 232 or indentations which engage with a like plurality of projections (not shown) on the container 900 to prevent unscrewing of the closure 200 once mounted. The mounting skirt 206 has several additional rotations of threads 210 to strengthen the closure force.

Figure 12:
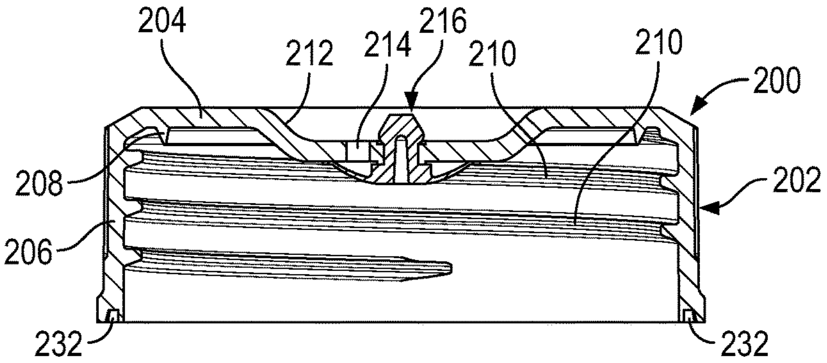
FIG. 12 is a cross-sectional view thereof taken along line 12-12 of FIG. 11.
Figure 13:
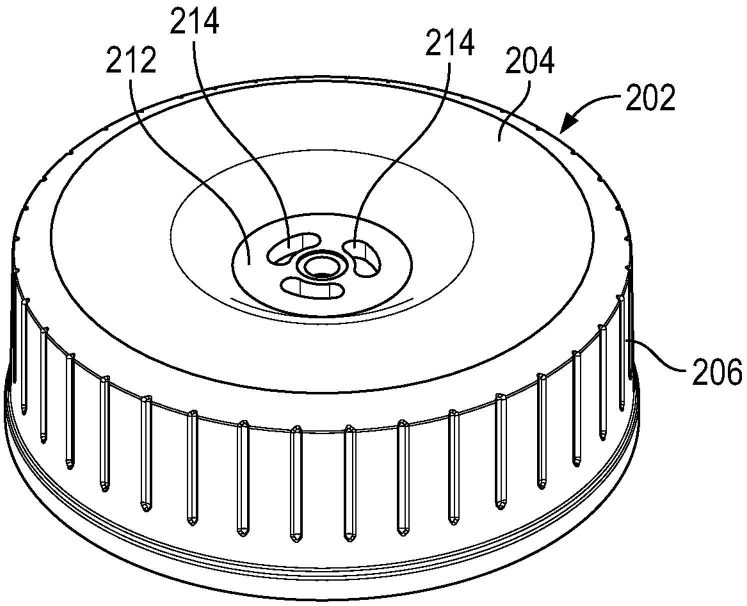
FIG. 13 is a perspective view of the closure body.

Referring to FIG. 12, it can be seen that in some embodiments the annular seal 208 may comprise a v-shaped rib without the inward angle. The straight v-shape can be used with the additional threads 210 which provide added sealing force against the underside of the closure deck 204.

The closure 200 is otherwise similar in structure and function to the embodiment 100 described above.

Referring now to FIGS. 15-19 yet another exemplary embodiment of a self-venting closure assembly is illustrated and generally indicated at 300. This closure assembly 300 is also generally the same as the previously described embodiment 100 and includes the same closure body 302, valve seat 312, vent openings 314 and umbrella valve 316, with only the following differences.

Figure 16:
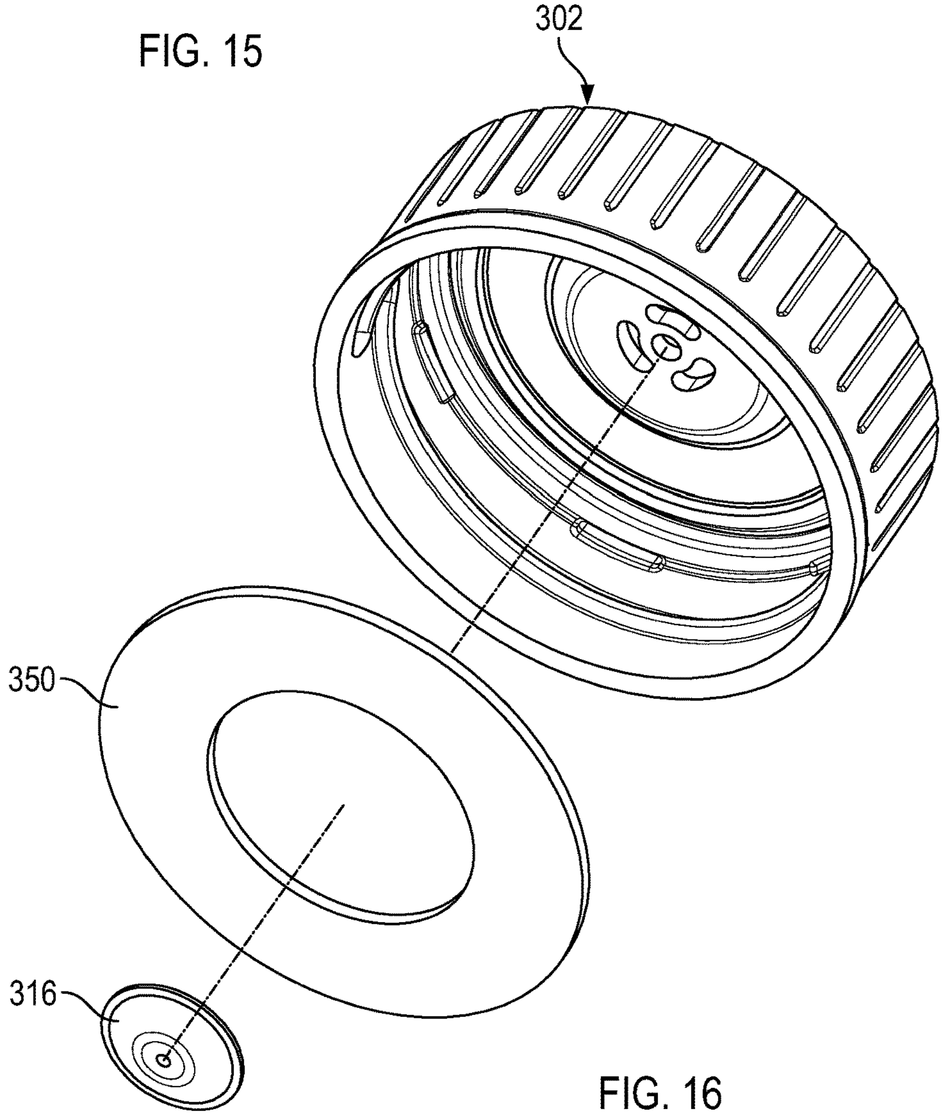
FIG. 16 is an exploded perspective view thereof.
Figure 17:
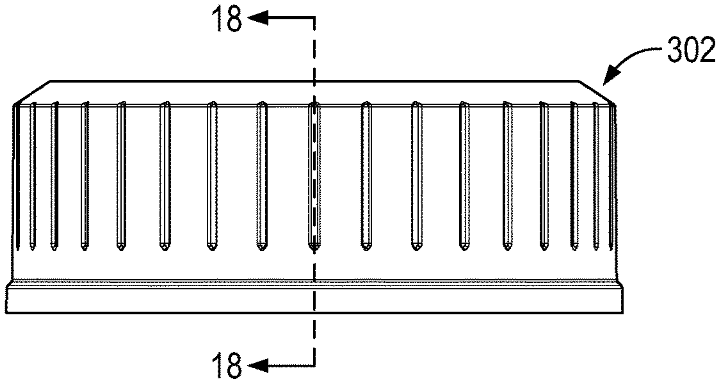
FIG. 17 is a plan view thereof.
Figure 18:
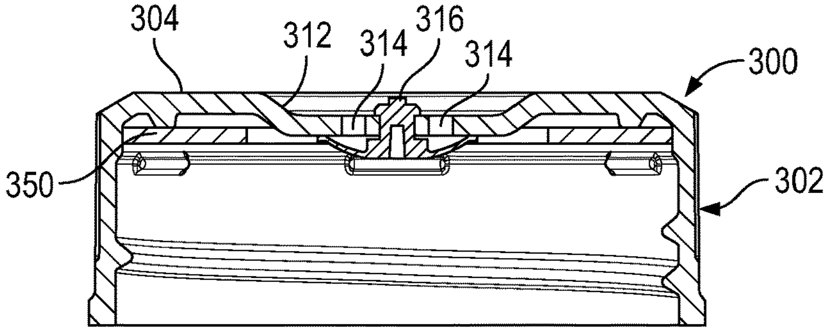
FIG. 18 is a cross-sectional view thereof taken along line 18-18 of FIG. 17.
Figure 19:
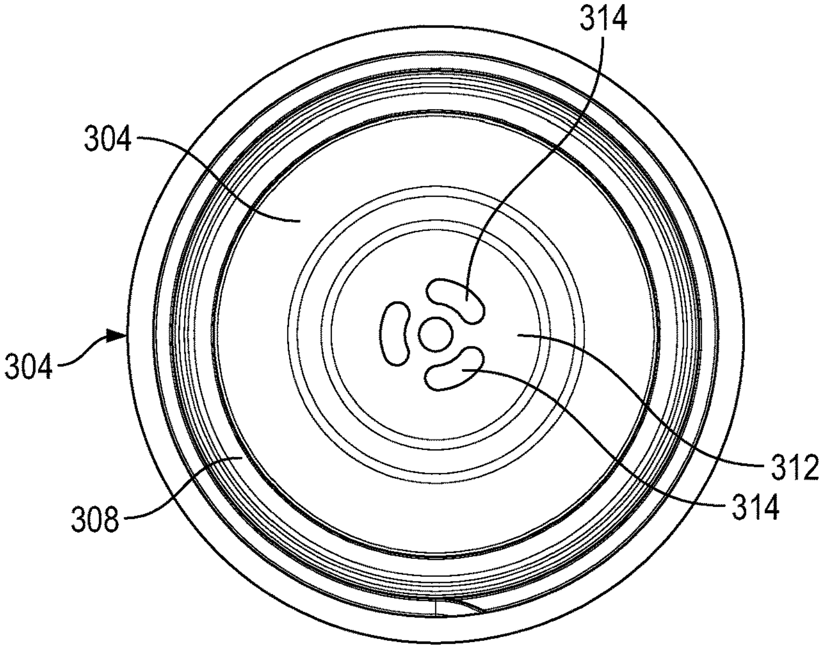
FIG. 19 is a bottom view of the closure body.

Referring to FIGS. 16 and 18, the assembly 300 further includes an annular foam or elastomeric gasket 350 received between the underside of the deck 304 and the upper lip of the vent opening 910 in the container 900.

Referring to FIG. 18 in particular, it can be seen that the annular seal 308 may comprise a flattened rib with a slight inward angle on its outer peripheral surface which is effective for squeezing the gasket 350 against the vent neck 920. Additionally, the valve seat 312 does not contain any offset providing the umbrella valve 316 with a full preloaded tension as molded.

The closure 300 is otherwise similar in structure and function to the embodiment 100 described above.

It can thus be appreciated that the exemplary embodiments provide unique configurations of a self-venting closure assemblies which simplify and reduce the number of parts and provide automatic venting without customer intervention, while also reducing the number of potential leak points between the liquid container and the exterior environment.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dispensing system for a liquid product, comprising:
- a container, comprising
  - a dispenser opening; and
  - a container neck, wherein the dispenser opening and the container neck are located on a common face of the container;
- a dispenser attached to the dispenser opening of the container; and
- a self-venting closure attached to the container neck, the self-venting closure comprising:
  - a deck with a peripheral mounting skirt;
  - a valve seat within the deck;
  - a mounting hole within the valve seat and wherein the valve seat has an exterior upper surface and an interior lower surface immediately surrounding the mounting hole, said upper and lower surface immediately surrounding the mounting hole being offset inwardly from the remainder of the valve seat;
  - a plurality of vent openings within the valve seat outwardly spaced around the mounting hole and wherein an underside of said valve seat includes a circular flat land area disposed outward of said plurality of vent openings; and
  - an elastomeric umbrella valve having an axial mounting stem received within the mounting hole, and having a frustoconical valve flap arranged on an underside of the valve seat, said frustoconical valve flap extending radially outward from the mounting stem and cooperating with the plurality of vent openings to allow air to flow into the container,
  - wherein the elastomeric umbrella valve having at least one retaining shoulder on an opposite side of the axial mounting stem from the frustoconical valve flap, and the at least one retaining shoulder is received in the offset inwardly exterior upper surface; and
  - wherein the frustoconical valve flap terminates with a peripheral annular sealing rim, the sealing rim having a flat sealing surface extending in parallel facing relation with the flat circular land area and which is engaged with the circular flat land area, the sealing rim further having a flat surface opposed to the flat sealing surface.

2. The dispensing system of claim 1, wherein the container further comprises a blow-molded container.

3. The dispensing system of claim 1, wherein the container neck comprises a neck projecting from the container.

4. The dispensing system of claim 3, wherein the container neck further comprises a mounting formation.

5. The dispensing system of claim 4, wherein the mounting formation further comprises a thread.

6. The dispensing system of claim 1, wherein the dispensing opening and the container neck are located on a side surface of the container.

7. The dispensing system of claim 6, wherein the dispenser comprises a tap dispenser.

8. The dispensing system of claim 1, wherein the self-venting closure is permanently secured to the container neck.

9. The dispensing system of claim 1, wherein the flat sealing surface disengages from the underside of the deck when there is a vacuum in the container.

10. A dispensing system for a liquid product, comprising:
- a container, comprising
  - a dispenser opening; and
  - a container neck opening, wherein the dispenser opening and the container neck opening are located on a common face of the container;
- a dispenser attached to the dispenser opening of the container; and
- a self-venting closure attached to the container neck opening, the self-venting closure comprising
  - a deck, comprising:
    - a mounting hole and wherein the deck has an exterior upper surface and an interior lower surface immediately surrounding the mounting hole, said upper and lower surfaces immediately surrounding the mounting hole being offset inwardly from the remainder of the deck; and at least one vent opening in the deck adjacent the mounting hole;
    - a mounting skirt extending off the deck; and
    - an elastomeric umbrella valve, comprising:
      - a mounting stem seated in the mounting hole; and
      - a frustoconical valve flap extending radially outward from the mounting stem, wherein the valve flap covers the at least one vent opening,
      - wherein the elastomeric umbrella valve having at least one retaining shoulder on an opposite side of the mounting stem from the frustoconical valve flap, and the at least one retaining shoulder is received in the offset inwardly exterior upper surface; and
      - wherein the frustoconical valve flap terminates in a peripheral annular sealing rim having a flat sealing surface which extends in parallel facing relation with a flat circular land area on an underside of the deck, and which engages with the flat circular land area, the sealing rim further having a flat surface opposed to the flat sealing surface.

11. The dispensing system of claim 10, wherein the self-venting closure is permanently attached to the container neck opening.

12. The dispensing system of claim 10, wherein the self-venting closure is ultrasonically welded to the container.

13. The dispensing system of claim 10, wherein the valve flap cooperates with the at least one vent opening to seal an interior of the container from atmosphere.

14. The dispensing system of claim 10, wherein the valve flap elastically deforms when there is a vacuum in an interior of the container.

15. The dispensing system of claim 10, wherein the dispensing opening and the container neck are located on a side surface of the container.

16. The dispensing system of claim 15, wherein dispenser comprises a tap dispenser.

17. A dispensing system for a liquid product, comprising:

a container, comprising a dispenser opening; and a container neck, wherein the dispenser opening and the container neck are located on a common face of the container;

a dispenser attached to the dispenser opening of the container; and a self-venting closure attached to the container neck, the self-venting closure comprising:

a deck with a peripheral mounting skirt;

a valve seat within the deck;

a mounting hole within the valve seat and wherein the valve seat has an exterior upper surface and an interior lower surface immediately surrounding the mounting hole, said upper and lower surfaces immediately surrounding the mounting hole being offset inwardly from the remainder of the valve seat;

a plurality of vent openings within the valve seat outwardly spaced around the mounting hole and wherein an underside of said valve seat includes a circular flat land area disposed outward of said plurality of vent openings; and an elastomeric umbrella valve having an axial mounting stem received within the mounting hole, and having a frustoconical valve flap arranged on an underside of the valve seat, said frustoconical valve flap extending radially outward from the mounting stem and cooperating with the plurality of vent openings to allow air to flow into the container, wherein the elastomeric umbrella valve having at least one retaining shoulder on an opposite side of the mounting stem from the frustoconical valve flap, and the at least one retaining shoulder is received in the offset inwardly exterior upper surface; and wherein the frustoconical valve flap terminates with a peripheral annular sealing rim, the sealing rim having a flat sealing surface which is engaged with the circular flat land area in parallel facing relation, the sealing rim further having a flat surface opposed to the flat sealing surface.

* * * * *